United States Patent
Chauvin

(10) Patent No.: US 7,798,190 B2
(45) Date of Patent: *Sep. 21, 2010

(54) CARCASS REINFORCEMENT FOR TIRE INTENDED TO BEAR HEAVY LOADS

(75) Inventor: Brigitte Chauvin, Chamalieres (FR)

(73) Assignee: Michelin-Recherche Et Technique S.A., Granges-Paccot (CH)

( * ) Notice: Subject to any disclaimer, the term of this patent is extended or adjusted under 35 U.S.C. 154(b) by 0 days.

This patent is subject to a terminal disclaimer.

(21) Appl. No.: 12/169,413

(22) Filed: Jul. 8, 2008

(65) Prior Publication Data

US 2008/0271831 A1 Nov. 6, 2008

Related U.S. Application Data

(63) Continuation of application No. 11/096,068, filed on Apr. 1, 2005, now abandoned, which is a continuation of application No. PCT/EP03/10521, filed on Sep. 22, 2003.

(30) Foreign Application Priority Data

Oct. 2, 2002 (FR) .................................. 02 12213

(51) Int. Cl.
*B60C 9/02* (2006.01)
*B60C 1/00* (2006.01)
*C08K 3/04* (2006.01)

(52) U.S. Cl. .................. 152/556; 524/495; 524/496; 524/571; 524/575.5

(58) Field of Classification Search ................. 524/495, 524/496; 152/556
See application file for complete search history.

(56) References Cited

U.S. PATENT DOCUMENTS

| | | | |
|---|---|---|---|
| 4,500,672 A | 2/1985 | Suzuki et al. | |
| 5,394,919 A | 3/1995 | Sandstrom et al. | |
| 5,945,500 A | 8/1999 | Durairaj et al. | |
| 6,420,488 B1 | 7/2002 | Penot | |

| | | | |
|---|---|---|---|
| 6,748,989 B2 | 6/2004 | Cordonnier et al. | |

FOREIGN PATENT DOCUMENTS

| | | |
|---|---|---|
| DE | 36 36 783 A1 | 5/1988 |
| EP | 0 941 871 A2 | 9/1999 |
| FR | 2 535 732 A1 | 5/1984 |
| FR | 2721038 A1 * | 12/1995 |
| GB | 2 198 138 A | 6/1988 |
| WO | 93/18094 A1 | 9/1993 |
| WO | 02/092680 A2 | 11/2002 |

OTHER PUBLICATIONS

English language translation, FR 2 721 038 A1, Dec. 15, 1995.*

* cited by examiner

*Primary Examiner*—Vickey Nerangis
(74) *Attorney, Agent, or Firm*—Buchanan Ingersoll & Rooney PC

(57) ABSTRACT

A carcass reinforcement for a tire which is intended to bear heavy loads, comprising a composite fabric which comprises a rubber composition of reduced hysteresis and metal cables reinforcing the composition. The elastomeric matrix thereof comprises natural rubber or a synthetic polyisoprene in a majority proportion, and a reinforcing filler comprising a carbon black which meets all of the following conditions:

(i) 45≦CTAB specific surface area in $m^2/g$ (in accordance with Standard ASTM D3765-80)≦70,
(ii) 45≦BET specific surface area in $m^2/g$ (in accordance with Standard ASTM D4820-93)≦70,
(iii) 45≦iodine adsorption index IA in mg/g (in accordance with Standard ASTM D1510-81)≦70,
(iv) ratio (BET surface area/index IA)≦1.07,
(v) 115≦DBP structure value in ml/100 g (in accordance with Standard ASTM D2414-93)≦170,
(vi) 85 nm≦Stokes diameter dst in nm≦145, where dst is the diameter of aggregates corresponding to the maximum frequency of the Stokes diameters in a distribution of aggregates, and (vii) D50/dst≧0.0090. CTAB+0.19, where D50 is the difference, in the distribution of aggregates, between the Stokes diameters of two aggregates corresponding to one and the same frequency equal to 50% of the maximum frequency of the Stokes diameters, dst and D50 being measured by centrifugal photosedimentometry.

30 Claims, No Drawings

CARCASS REINFORCEMENT FOR TIRE INTENDED TO BEAR HEAVY LOADS

CROSS-REFERENCE TO RELATED APPLICATIONS

The present application is a continuation of application Ser. No. 11/096,068 filed Apr. 1, 2005, which is a continuation of PCT Application No. PCT/EP2003/010521, filed Sep. 22, 2003, published in French on Apr. 15, 2004, as WO 2004/030946, which claims priority of French Application No. 02/12213, filed Oct. 2, 2002, the entire contents of these applications being incorporated herein in their entirety.

FIELD OF THE INVENTION

The present invention relates to a carcass reinforcement for a tire which is intended to bear heavy loads, such as a heavy-vehicle or construction-machinery tire, and to such a heavy-vehicle or construction-machinery tire.

DESCRIPTION OF RELATED ART

Radial-carcass tires for motor vehicles bearing heavy loads, in particular for heavy vehicles, comprise reinforcements which are formed of reinforcing threads or plies of metal wires coated with elastomers. More precisely, these tires comprise, in their bottom zone, one or more bead wires, a carcass reinforcement extending from one bead wire to the other and, in their crown, a crown reinforcement comprising at least two crown plies.

These heavy-vehicle tires are designed to be able to be retreaded one or more times when the treads which they comprise reach a critical degree of wear after prolonged travel, which involves having a carcass reinforcement which has not been subject to significant damage, for each tire to be retreaded the tread of which has reached this degree of wear.

When running under heavy load, the "band" of the carcass (central zone on either side of the median circumferential plane of the tire) is subjected to flexural stresses which may be very high, hence the necessity of imparting a high mechanical strength to this "band", and the bottom zone of the tire (close to each of the two upturns of the carcass) may be the seat of operating temperatures which are also very high, hence the necessity of imparting reduced hysteresis to this bottom zone.

Consequently, with the aim of minimising the embrittlement of the tire and of delaying the appearance of damage therein, a carcass reinforcement of heavy-vehicle type must be both as cohesive as possible, to resist the mechanical stresses during travel, and of as low hysteresis as possible, to minimise the heating during travel and also to limit the thermochemical and possibly thermo-oxidising change of the internal compositions.

It is known to the person skilled in the art that the use, in a rubber composition for a heavy-vehicle carcass reinforcement and in a quantity of approximately 50 phr (parts by weight per hundred parts of elastomer(s)), of a relatively structured grade 300 carbon black, such as the black N347, or a less structured one, such as the black N326, makes it possible to improve the cohesion, endurance and hysteresis of this composition, which imparts a longer life to the carcass reinforcement and, consequently, to the corresponding heavy-vehicle tire.

It is also known that coarse carbon blacks, such as the black N539, only impart sufficient cohesion to a heavy-vehicle carcass reinforcement composition if these blacks are present in this composition in a very large quantity, which may have the undesirable effect of adversely affecting the hysteresis of this composition.

Japanese patent specification JP-A-04/274 901 discloses the use of specific carbon blacks in rubber compositions which are equally well intended for at least three distinct zones of a tire having specifically a reduced weight, for imparting to this lightweight tire improved properties of rolling resistance and reinforcement, compared with those exhibited by a tire the same zones of which comprise compositions each comprising a grade 300 carbon black.

These specific carbon blacks have a specific surface area $N_2SA$ (measured in accordance with Standard ASTM D3037 of 1984) of from 60 to 84 $m^2/g$, a "DBP" structure value (measured in accordance with Standard JIS K 6221) of from 120 to 200 ml/100 g and they have a surface chemistry which is such that the ratio "$N_2SA/IA$" of said specific surface area to the iodine adsorption index "IA" (also measured in accordance with Standard JIS K 6221) is equal to or greater than 1.10.

Japanese patent specification JP-A-02/103 268 discloses the use of carbon blacks to improve the hysteresis and reinforcement properties of rubber compositions for carcass reinforcements for any tires, or even more generally intended for damping vibrations.

These carbon blacks have a CTAB specific surface area (measured in accordance with Standard ASTM D3765-80) of from 50 to 75 $m^2/g$, a "DBP" structure value (measured in accordance with Standard JIS K 6221) equal to or greater than 105 ml/100 g and they have a surface chemistry which is such that the ratio "$N_2SA/IA$" of the specific surface area "$N_2SA$" (measured in accordance with Standard ASTM D3037-86) to the iodine adsorption index "IA" (measured in accordance with Standard JIS K 6221) is equal to or greater than 1.10.

It will be noted that these last two documents do not relate to tires intended to bear heavy loads, and certainly not to a carcass reinforcement of the type having metal cables which is specifically intended to be fitted on such heavy-vehicle or construction-machinery tires.

SUMMARY OF THE INVENTION

The object of the present invention is to propose a novel carcass reinforcement for a tire which is intended to bear heavy loads, such as a heavy-vehicle or construction-machinery tire, this reinforcement comprising a composite fabric which comprises a cross-linkable or cross-linked rubber composition having a reduced hysteresis in the cross-linked state and metal cables reinforcing this composition.

This object is achieved in that the Applicants have recently surprisingly discovered that the association, with an elastomeric matrix comprising natural rubber or a synthetic polyisoprene in a majority proportion, of a reinforcing filler comprising a carbon black which meets all the following conditions:

(i) $45 \leq$ CTAB specific surface area in $m^2/g$ (in accordance with Standard ASTM D3765-80) $\leq 70$, (ii) $45 \leq$ BET specific surface area in $m^2/g$ (in accordance with Standard ASTM D4820-93) $\leq 70$, (iii) $45 \leq$ iodine adsorption index IA in mg/g (in accordance with Standard ASTM D1510-81) $\leq 70$ (iv) ratio (BET surface area/index IA) $\leq 1.07$, (v) $115 \leq$ DBP structure value in ml/100 g (in accordance with Standard ASTM D2414-93) $\leq 170$, (vi) 85 nm $\leq$ Stokes diameter dst in nm $\leq 145$, where dst is the diameter of aggregates corresponding to the maximum frequency of the Stokes diameters in a distribution of aggregates, and (vii) $D50/dst \geqq 0.0090 \cdot CTAB + 0.19$, where D50 is the difference, in the distribution of aggregates, between the Stokes diameters of two aggregates corresponding to one and the same frequency equal to 50% of the maximum frequency of the Stokes diameters, dst and D50 being measured by centrifugal photosedimentometry, makes it possible to obtain a rubber composition which has in the cross-linked state improved hysteresis properties at high deformations, in comparison with the hysteresis properties of known compositions comprising a grade 300 carbon black and having substantially one and the same modulus of elongation at low deformation.

It will be noted that the carcass reinforcement according to the invention comprises a carbon black having a ratio (BET surface area/index IA) of reduced value and a ratio D50/dst which increases with the CTAB specific surface area, these ratios imparting respectively to the blacks according to the invention a surface chemistry and a morphology which are particularly suitable.

DETAILED DESCRIPTION OF THE INVENTION

The elastomeric matrix of the rubber composition according to the invention may advantageously be formed of natural rubber or synthetic polyisoprene, or alternatively of a blend of natural rubber or synthetic polyisoprene with one or more other diene elastomers.

In this second case, the natural rubber or the synthetic polyisoprene is present in a majority proportion in the matrix, that is to say in a quantity greater than 50 phr (parts by weight per hundred parts of elastomers). Preferably, the natural rubber or the polyisoprene is present in a quantity equal to or greater than 70 phr.

Among the diene elastomers which may be used in a blend with the natural rubber or the synthetic polyisoprene, mention may be made of the diene elastomers, whether functional or not, belonging to the group consisting of polybutadienes, copolymers of styrene and butadiene (SBR) prepared in solution or in emulsion, copolymers of butadiene and isoprene (BIR) and terpolymers of styrene, butadiene and isoprene (SBIR).

Preferably, the polybutadiene used comprises a majority of cis-1,4 linkages and the SBR used comprises a majority of trans-1,4 linkages.

These elastomers may be modified during polymerisation or after polymerisation by means of branching agents such as divinylbenzene, or coupling or starring agents such as carbonates, halo-tins, halo-silicons, or alternatively by means of functionalising agents resulting in grafting on the chain or at the chain end of hydroxyl, carbonyl, carboxyl groups or alternatively of amine groups (for example by means of dimethylamino-benzophenone or diethylamino-benzophenone as functionalising agent).

According to another characteristic of the invention, said carbon black furthermore satisfies the following condition:

(viii) $80 \leqq DBPC$ structure value in ml/100 g (in accordance with Standard ASTM D3493-91)$\leqq 130$, DBPC being measured after 4 compressions at 24,000 psi.

Preferably, said carbon black furthermore meets the following condition:

(ix) $85 \leqq DBPC$ structure value in ml/100 g $\leqq 125$.

Preferably, the carbon black used in the composition according to the invention furthermore meets the following three conditions:

(x) $50 \leqq CTAB$ specific surface area in $m^2/g \leqq 65$,
(xi) $50 \leqq BET$ specific surface area in $m^2/g \leqq 65$,
(xii) $50 \leqq$ iodine adsorption index IA in mg/g $\leqq 65$.

Equally preferably, said carbon black furthermore meets the condition:

(xiii) ratio (BET surface area)/(index IA)$\leqq 1.05$.

Equally preferably, said carbon black furthermore meets the condition:

(xiv) $120 \leqq DBP$ structure value in ml/100 g $\leqq 165$.

Equally preferably, said carbon black furthermore meets the condition:

(xv) 90 nm $\leqq$ Stokes diameter dst in nm $\leqq 140$.

Equally preferably, said carbon black furthermore meets the condition:

(xvi) $D50/dst \geqq 0.0092 \cdot CTAB + 0.21$.

The values dst and D50 are measured by means of a centrifugal photosedimentometer of type "DCP" (Disk Centrifuge Photosedimentometer), sold by Brookhaven Instruments. The operating method for these measurements is as follows:

A sample of carbon black is dried, in accordance with Standard JIS K6221 (1975). Then 10 mg of carbon black thus dried is suspended in 40 ml of an aqueous solution of 15% ethanol and 0.05% of a non-ionic surfactant (by volume).

The dispersion of carbon black is obtained by ultrasound treatment for 10 minutes, by means of a 600 Watt ultrasonic probe. To this end an ultrasound generator designated "Vibracell ½ inch" sold by Bioblock and adjusted to 60% of its power (namely to 60% of maximum amplitude) is used.

A gradient solution composed of 15 ml water (with 0.05% non-ionic surfactant) and 1 ml ethanol is injected into the disc of the sedimentometer, rotating at 8,000 rpm, then 0.30 ml of the suspension of carbon black is injected on to the surface of the gradient solution. The mass size distribution curve is recorded for 120 minutes. A software program provides said values dst and D50 in nm.

The carbon black according to the invention may be used on its own as reinforcing filler, or alternatively in a blend with a reinforcing organic filler and/or a reinforcing inorganic filler. The quantity of carbon black used may vary from 30 phr to 70 phr and, preferably, from 35 to 65 phr.

In the case of a blend with a reinforcing organic or inorganic filler, said carbon black is present in a majority proportion in the reinforcing filler (i.e. in a mass fraction greater than 50%). Preferably, the mass fraction of carbon black in the reinforcing filler is greater than 70%.

According to a particularly advantageous embodiment of the invention, the reinforcing organic filler comprises a methylene acceptor/donor system (what is called an "M.A.D." system), which designates compounds suitable for reacting together to generate a three-dimensional reinforcing resin by condensation.

In known manner, the term "methylene acceptor" designates the reactant with which the methylene donor compound reacts by formation of methylene bridges (—CH2—), upon the curing of the composition, thus resulting in the formation in situ of the three-dimensional resin lattice. The methylene acceptor must be capable of dispersing perfectly in the elastomeric matrix.

Particularly suitable as methylene acceptors are phenols, the generic name for hydroxylated derivatives of arenes, and the equivalent compounds. This definition covers in particular monophenols, for example phenol or hydroxybenzene, bisphenols, polyphenols (polyhydroxyarenes), substituted phenols such as alkylphenols or aralkylphenols, for example bisphenols, diphenylolpropane, diphenylolmethane, naphthols, cresol, t-butylphenol, octylphenol, nonylphenol, xylenol, resorcinol or analogous products.

Preferably phenolic resins referred to as "novolac resins", also called phenol-aldehyde precondensates, resulting from the precondensation of phenolic compounds and aldehydes, in particular formaldehyde, are used as methylene acceptor. In known manner, these novolac resins (also referred to as "two-step resins") are thermoplastic and require the use of a curing agent (methylene donor) to be cross-linked, unlike, for example, Resols® which are thermohardening; they have sufficient plasticity not to interfere with the processing of the rubber composition. After cross-linking by the methylene donor (they may then be referred to as "thermohardened" novolac resins), they are characterised in particular by a tighter three-dimensional lattice than that of the Resols®.

The quantity of methylene acceptor must be between 1 and 10 phr; below 1 phr, the technical effect desired is inadequate, whereas beyond 10 phr there are risks of excessive stiffening and excessive compromising of the hysteresis. For all these reasons, a quantity of between 1.5 and 8 phr is more preferably selected, amounts lying within a range from 2 to 4 phr being particularly advantageous.

A curing agent, capable of cross-linking or hardening the methylene acceptor previously described, also commonly referred to as "methylene donor", must be associated with this acceptor.

Preferably, the methylene donor is selected from the group consisting of hexamethylenetetramine ("HMT"), hexamethoxymethylmelamine ("H3M"), hexaethoxymethylmelamine, formaldehyde polymers such as p-formaldehyde, N-methylol derivatives of melamine, or mixtures of these compounds. More preferably, this donor is selected from among HMT, H3M or a mixture of these compounds.

The quantity of methylene donor must be between 0.5 and 5 phr; below 0.5 phr, the technical effect desired is inadequate, whereas beyond 5 phr there are risks of compromising the processing in the uncured state of the compositions (for example, problem of solubility of the HMT) or of the vulcanisation (slowing in the presence of H3M). For these reasons, a quantity of between 0.5 and 3.5 phr is more preferably selected, amounts lying within a range from 1 to 3 phr being particularly advantageous.

Finally, the quantity of methylene donor, in the aforementioned ranges, is advantageously adjusted so as to represent between 10% and 80%, more preferably within a range from 40 to 60%, by weight relative to the quantity of methylene acceptor.

In the present application, "reinforcing inorganic filler", in known manner, is understood to mean an inorganic or mineral filler, whatever its colour and its origin (natural or synthetic), also referred to as "white" filler or sometimes "clear" filler in contrast to carbon black, this inorganic filler being capable, on its own, without any other means than an intermediate coupling agent, of reinforcing a rubber composition intended for the manufacture of tires, i.e. capable of replacing a conventional tire-grade carbon black filler in its reinforcement function.

Preferably, all or at the very least a majority proportion of the reinforcing inorganic filler is silica ($SiO_2$). The silica used may be any reinforcing silica known to the person skilled in the art, in particular any precipitated silica having a BET surface area and a CTAB specific surface area both of which are less than 450 $m^2/g$, even if the highly dispersible precipitated silicas are preferred. Even more preferably, the silica has BET or CTAB specific surface areas both of which are from 70 to 250 $m^2/g$ and, preferably, from 80 to 240 $m^2/g$.

The BET specific surface area of the silica is determined in known manner, in accordance with the method of Brunaner, Emmett and Teller described in "The Journal of the American Chemical Society" vol. 60, page 309, February 1938, corresponding to Standard AFNOR-NFT 45007 (November 1987); the CTAB specific surface area is the external surface area determined in accordance with the same Standard AFNOR-NFT-45007 of November 1987.

"Highly dispersible silica" is understood to mean any silica having a very substantial ability to disagglomerate and to disperse in an elastomeric matrix, which can be observed in known manner by electron or optical microscopy on thin sections. As non-limitative examples of such preferred highly dispersible silicas, mention may be made of the silicas [sic] Perkasil KS 430 from Akzo, the silicas BV3380 and BV3370GR from Degussa, the silicas Zeosil 1165 MP and 1115 MP from Rhodia, the silica Hi-Sil 2000 from PPG, the silicas Zeopol 8741 or 8745 from Huber, and treated precipitated silicas such as, for example, the aluminium-"doped"silicas described in European patent specification EP-A-0 735 088.

Other silicas which are not highly dispersible, such as the silica Perkasil KS404 from Akzo and the silicas Ultrasil VN2 or VN3, may also be used.

The physical state in which the reinforcing inorganic filler is present is immaterial, whether it be in the form of a powder, microbeads, granules or alternatively balls. Of course, "reinforcing inorganic filler" is also understood to mean mixtures of different reinforcing inorganic fillers, in particular of highly dispersible silicas such as described above.

As reinforcing inorganic filler, it is also possible to use, although this is not limiting, aluminas (of formula $Al_2O_3$), such as the aluminas of high dispersibility which are described in European patent specification EP-A-810 258, or alternatively aluminium hydroxides, such as those described in international patent specification WO-A-99/28376.

Also suitable as reinforcing inorganic fillers are carbon blacks modified by silica, such as, although this is not limiting, the fillers sold by CABOT under the name "CRX 2000", which are described in international patent specification WO-A-96/37547.

In the event that the carbon black according to the invention is used in a blend with a reinforcing inorganic filler, the rubber composition according to the invention may furthermore comprise in conventional manner a reinforcing inorganic filler/elastomeric matrix bonding agent (also referred to as coupling agent), the function of which is to ensure sufficient chemical and/or physical bonding between said inorganic filler and the matrix, while facilitating the dispersion of the inorganic filler within the matrix.

"Coupling agent" is more precisely understood to mean an agent capable of establishing a sufficient chemical and/or physical connection between the filler in question and the elastomer, while facilitating the dispersion of this filler within the elastomeric matrix. Such a coupling agent, which is at least bifunctional, has, for example, the simplified general formula "Y-T-X", in which:

Y represents a functional group ("Y" function) which is capable of bonding physically and/or chemically with the inorganic filler, such a bond being able to be established, for example, between a silicon atom of the coupling agent and the surface hydroxyl (OH) groups of the inorganic filler (for example, surface silanols in the case of silica);

X represents a functional group ("X" function) which is capable of bonding physically and/or chemically with the elastomer, for example by means of a sulphur atom;

T represents a group making it possible to link Y and X.

Silica/elastomer coupling agents in particular have been described in a large number of documents, the best known being bifunctional alkoxysilanes such as polysulphurised alkoxysilanes.

As polysulphurised alkoxysilanes, mention will be made more particularly of the polysulphides (in particular disulphides, trisulphides or tetrasulphides) of bis-(($C_1$-$C_4$)alkoxyl-($C_1$-$C_4$) alkylsilyl-($C_1$-$C_4$)alkyl), such as for example the polysulphides of bis(3-trimethoxysilylpropyl) or of bis(3-triethoxysilylpropyl). Of these compounds, in particular bis(3-triethoxysilylpropyl) tetrasulphide, abbreviated TESPT, of the formula $[(C_2H_5O)_3Si(CH_2)_3S_2]_2$, or bis(triethoxysilylpropyl)disulphide, abbreviated TESPD, of the formula $[(C_2H_5O)_3Si(CH_2)_3S]_2$, are used. TESPD is sold, for example, by Degussa under the names Si266 or Si75 (in the latter case, in the form of a mixture of disulphide (75% by weight) and of polysulphides), or alternatively by Witco under the name Silquest A1589. TESPT is sold, for example, by Degussa under the name Si69 (or X50S when it is supported to 50% by weight on carbon black), or alternatively by Osi Specialties under the name Silquest A1289 (in both cases, a commercial mixture of polysulphides having an average value of n close to 4). Mention will also be made of tetrasulphurised monoalkoxysilanes, such as monoethoxydimethylsilylpropyl tetrasulphide (abbreviated to MESPT), which are the subject of international patent application PCT/EP02/03774.

The compositions according to the invention are capable of cross-linking under the action of sulphur, peroxides or bis-maleimides with or without sulphur. They may also contain the other constituents conventionally used in rubber mixes, such as a conventional non-reinforcing inorganic filler (for example clay, bentonite, talc, chalk, kaolin or titanium oxides), plasticisers, pigments, antioxidants, processing agents, cross-linking accelerators such as benzothiazole derivatives, diphenylguanidine and, in the present case of rubber compositions for carcass reinforcements provided to have satisfactory adhesion to metal, a cobalt salt and/or a silica/resin association.

The compositions according to the invention may be prepared using known thermomechanical working processes for the constituents in one or more stages. For example, they may be obtained by thermomechanical working in an internal mixer in one stage which lasts from 3 to 7 minutes, with a speed of the blades of 50 rpm, or in two stages which last from 3 to 5 minutes and from 2 to 4 minutes respectively, this thermomechanical working being followed by mechanical working or a finishing stage effected at about 80° C., during which the sulphur, the vulcanisation accelerators (in the case of a sulphur-cross-linked composition) and possibly said cobalt salt are incorporated.

In the event that a reinforcing organic filler of type methylene acceptor/donor system is used in the composition according to the invention, the methylene donor is only introduced during the step of mechanical working, unlike the methylene acceptor, which is introduced during the thermomechanical working.

The carcass reinforcement according to the invention is preferably such that, in the composite fabric used as heavy-vehicle or construction-machinery carcass ply, the density of the metal cables is of between 15 and 100 cables per dm of radial ply and the distance between two adjacent radial cables, from axis to axis, is preferably of between 1 and 6 mm.

In a heavy-vehicle carcass ply, this cable density is preferably of between 40 and 100 cables per dm, more preferably between 50 and 80 cables per dm, and the distance between two adjacent radial cables, from axis to axis, is preferably of between 1.0 and 2.5 mm, more preferably between 1.25 and 2 mm.

In a construction-machinery carcass ply, this cable density is preferably of between 15 and 70 cables per dm, more preferably between 20 and 35 cables per dm, and the distance between two adjacent radial cables, from axis to axis, is preferably of between 2 and 6 mm, more preferably between 2.5 and 5.5 mm.

These cables according to the invention are preferably arranged such that the width ("l") of the rubber bridge between two adjacent cables is of between 0.25 mm and 1.5 mm. In a heavy-vehicle carcass ply, the width l is more preferably of between 0.25 and 1 mm and, in a construction-machinery carcass ply, this width l is more preferably of between 0.25 and 1.5 mm.

This width l in known manner represents the difference between the calendering pitch (laying pitch of the cable in the rubber fabric) and the diameter of the cable. Below the minimum value indicated, the rubber bridge, which is too narrow, risks mechanically degrading during working of the ply, in particular during the deformation which it experiences in its own plane by extension or shearing. Beyond the maximum indicated, there are risks of flaws in appearance occurring on the sidewalls of the tires or of penetration of objects, by perforation, between the cables.

For these reasons, the width l is even more preferably selected to be between 0.35 and 0.85 mm, be it for a heavy-vehicle or construction-machinery carcass ply.

Equally preferably, the rubber composition of this composite fabric has, in the cross-linked state (i.e., after curing) and measured in accordance with Standard ASTM D 412, a secant tensile modulus M10 which is less than 12 MPa, more preferably of between 5 and 11 MPa. It is within such a field of moduli that the best compromise of endurance in the composite fabrics of the carcass reinforcement has been recorded.

A heavy-vehicle or construction-vehicle tire according to the invention is such that it comprises this carcass reinforcement.

This heavy-vehicle or construction-machinery tire comprises in known manner a crown, two sidewalls and two beads, each of these beads being reinforced by a bead wire. The crown is conventionally reinforced by a crown reinforcement formed for example of at least two superposed crossed plies, reinforced by metal cables. The carcass reinforcement is wound around the two bead wires within each bead, the upturn of the reinforcement being for example arranged towards the outside of the tire.

The carcass reinforcement is formed of at least one ply reinforced by so-called "radial" metal cables, that is to say that they are arranged practically parallel to each other and extend from one bead to the other, forming an angle of between 80° and 90° with the median circumferential plane (plane perpendicular to the axis of rotation of the tire which is located halfway between the two beads and passes through the centre of the crown reinforcement).

The aforementioned characteristics of the present invention, as well as others, will be better understood on reading the following description of several examples of embodiment of the invention, which are given by way of illustration and not of limitation.

In these examples, the properties of the compositions are evaluated as follows:

Mooney Viscosity

The Mooney viscosity ML, (1+4) is measured in accordance with Standard ASTM D1646 (1999).

Shore A Hardness

The Shore A hardness is measured in accordance with standard ASTM D2240 (1997).

Moduli of Elongation

The moduli of elongation are measured at 10% (M10) at a temperature of 23° C. in accordance with Standard ASTM D412 (1998) on ASTM C test pieces. These are true secant moduli in MPa, that is to say the secant moduli calculated reduced to the real cross-section of the test piece at the given elongation.

Break Indices

These indices are measured at 100° C. The properties at break, breaking stress FR in MPa and elongation at break AR in % are measured in accordance with Standard ASTM D412 (1998). The measurements are carried out on ASTM C test pieces.

The "control" composition 1 is representative of the known prior art, and comprises 52 phr of black N347 as reinforcing filler.

Compositions 2 to 7 according to the invention comprise a carbon black A for compositions 2 to 5, or a carbon black B for compositions 6 and 7.

Carbon black A is sold tnder the name "CRX1416B" by CABOT, and carbon black B is sold under the name "EX 3-3" by COLUMBIAN.

Composition 5 differs from composition 4 in that it furthermore comprises a processing aid sold by RHEIN CHEME under the name "AFLUX 42", in order to reduce the viscosity of composition 5 in the non-cross-linked state).

All these compositions are sulphur-cross-linkable.

TABLE 1

|  | Comp. 1 | Comp. 2 | Comp. 3 | Comp. 4 | Comp. 5 | Comp. 6 | Comp. 7 |
| --- | --- | --- | --- | --- | --- | --- | --- |
| NR | 100 | 100 | 100 | 100 | 100 | 100 | 100 |
| Black N347 | 52 | | | | | | |
| Black A | | 52 | 55 | 58 | 58 | | |
| Black B | | | | | | 55 | 58 |
| ZnO | 9 | 9 | 9 | 9 | 9 | 9 | 9 |
| Stearic acid | 0.65 | 0.65 | 0.65 | 0.65 | 0.65 | 0.65 | 0.65 |
| Antioxidant | 1.50 | 1.50 | 1.50 | 1.50 | 1.50 | 1.50 | 1.50 |
| "AFLUX 42" | | | | | 3 | | |
| Cobalt salt* | 0.20 | 0.20 | 0.20 | 0.20 | 0.20 | 0.20 | 0.20 |
| Insoluble sulphur | 7.6 | 7.6 | 7.6 | 7.6 | 7.6 | 7.6 | 7.6 |
| Accelerator | 0.93 | 0.93 | 0.93 | 0.93 | 0.93 | 0.93 | 0.93 |

*phr of cobalt metal

Tearability Indices

These indices are measured at 100° C. The breaking load (FRD) in N/mm of thickness and the elongation at break (ARD) in % are measured on a test piece of dimensions 10×105×2.5 mm notched at its centre over a depth of 5 mm.

Hysteresis Losses (HL)

They are measured in % by rebound at 60° C. at the sixth impact, in accordance with the equation:

HL (%)=100×($W_0-W_1$)/$W_1$, with $W_0$: energy supplied and $W_1$: energy restored.

Dynamic Properties

The dynamic characteristics of the materials are analysed on a Schenck machine, in accordance with Standard ASTM D 5992 (1996). The response of a sample of vulcanised material (cylindrical test piece of a thickness of 4 mm and a section of 400 mm$^2$), subjected to an alternating single sinusoidal shearing stress, at a frequency of 10 Hz and at 60° C., is recorded. Scanning is effected at an amplitude of deformation of 0.1 to 50% (outward cycle), then of 50% to 0.1% (return cycle). The maximum shear modulus G*max in MPa and the maximum value of the tangent of the loss angle tan delta max is determined during the outward cycle.

EXAMPLES OF EMBODIMENT OF THE INVENTION

1) First Series of Examples

The object of these examples is to compare compositions based on natural rubber (NR hereafter) reinforced with carbon black, with quantities of black of from 52 to 58 phr. These compositions are specified in Table 1 hereafter (in phr).

The natural rubber (NR) which is used is peptised and has a Mooney viscosity ML (1+4) at 100° C. equal to 60.

The antioxidant used is N-(1,3-dimethylbutyl)-N'-phenyl-p-phenylenediamine.

The carbon blacks used are set forth in Table 2 below:

TABLE 2

|  | N347 | Black A | Black B |
| --- | --- | --- | --- |
| CTAB in m$^2$/g | 88 | 55 | 50 |
| BET in m$^2$/g | 88 | 53 | 50 |
| IA in mg/g | 90 | 62 | 56 |
| BET/IA | 0.98 | 0.85 | 0.89 |
| DBP in ml/100 g | 124 | 134 | 130 |
| DBPC in ml/100 g | 100 | 94 | 88 |
| dst in nm | 77 | 131 | 133 |
| D50 in nm | 53 | 103 | 113 |
| D50/dst | 0.688 | 0.786 | 0.849 |

These compositions 1 to 7 are obtained by mixing all the aforementioned constituents, except for the cobalt salt, the sulphur and the accelerator, by thermomechanical working in an internal mixer in one step which lasts approximately 4 minutes with a speed of rotation of the blades of 50 rpm, until a dropping temperature of approximately 170° C. is reached, followed by a finishing step effected at 80° C., during which the cobalt salt, the sulphur and the vulcanisation accelerator are incorporated.

The cross-linking is effected at 150° C. for a time sufficient to achieve 99% of the maximum torque on a rheometer.

The properties in the cross-linked state and in the non-cross-linked state of these compositions 1 to 7 were compared. The results are set forth in Table 3 below.

TABLE 3

|  | Comp. 1 | Comp. 2 | Comp. 3 | Comp. 4 | Comp. 5 | Comp. 6 | Comp. 7 |
|---|---|---|---|---|---|---|---|
| ML(1 + 4) at 100° C. | 52 | 52 | 55 | 58 | 52 | 48 | 52 |
| Shore | 80 | 78 | 80 | 81 | 81 | 77 | 79 |
| M10 in MPa | 9.13 | 7.67 | 8.03 | 8.94 | 9.49 | 8.27 | 8.92 |
| as base 100 | 100 | 84 | 88 | 98 | 104 | 89 | 96 |
| HL in % | 22.85 | 17.13 | 17.13 | 18.05 | 18.96 | 16.85 | 18.00 |
| as base 100 | 100 | 75 | 75 | 79 | 83 | 74 | 79 |
| G* max 60° C. | 8.24 | 5.76 | 6.43 | 8.82 | 8.04 |  |  |
| as base 100 | 100 | 70 | 78 | 107 | 97 |  |  |
| Tan delta max 60° C. | 0.163 | 0.130 | 0.132 | 0.142 | 0.139 |  |  |
| as base 100 | 100 | 80 | 81 | 87 | 85 |  |  |
| Break 100° C. |  |  |  |  |  |  |  |
| FR in MPa | 16.0 | 14.7 | 14.1 | 15.1 | 14.1 | 14 | 14 |
| AR in % | 360 | 360 | 326 | 323 | 308 | 359 | 364 |
| Tearability 100° C. |  |  |  |  |  |  |  |
| FRD in N/mm | 30 | 33 | 38 | 34 | 25 | 36 | 29 |
| ARD in % | 97 | 84 | 87 | 87 | 77 | 88 | 85 |

It would appear that the carbon blacks A or B impart to compositions 4, 5 and 7 according to the invention hysteresis properties at high deformation (HL, at 60° C.) which are improved by 17% to 21% relative to those of the "control" composition comprising the black N347, these compositions according to the invention furthermore having a modulus of elongation at low deformation (M10) which is close to that of said "control" composition, which makes these compositions according to the invention particularly well suited for use in the carcass reinforcement of tires intended to bear heavy loads.

It will be noted that the other properties of these compositions 4, 5 and 7 according to the invention are comparable to those of said "control" composition.

It will also be noted that the incorporation in the composition 5 of the processing aid imparts to this composition 5 a viscosity in the non-cross-linked state and, consequently, a processing ability which is similar to that of the "control" composition, and practically without adversely affecting the hysteresis properties of this composition 5.

2) Second Series of Examples

The object of the following examples is to compare two rubber compositions each having in the cross-linked state a secant tensile modulus M10 of approximately 6 MPa, which are both based on natural rubber and which comprise respectively two different carbon blacks as reinforcing filler, in a quantity of black of between 40 and 50 phr.

The first composition 8 is a "control" composition representing the known prior art, and it comprises 45 phr of carbon black designated "N326".

The second composition 9 is in accordance with the invention, and it comprises 48 phr of said carbon black A designated "CRX1416B".

Table 4 below lists the characteristics of these carbon blacks N326 and A.

TABLE 4

|  | N326 | Black A |
|---|---|---|
| CTAB in m²/g | 83 | 55 |
| BET in m²/g | 84 | 53 |
| IA in mg/g | 82 | 62 |
| BET/IA | 1.02 | 0.85 |

TABLE 4-continued

|  | N326 | Black A |
|---|---|---|
| DBP in ml/100 g | 72 | 134 |
| DBPC in ml/100 g | 69 | 94 |
| dst in nm | 72 | 131 |
| D50 in nm | 54 | 103 |
| D50/dst | 0.75 | 0.786 |

It will be noted that this black N326 is such that D50/Dst does not meet the aforementioned condition (vii) according to the invention, since 0.75 is less than 0.0090·CTAB+ 0.19=0.937.

The formulations of these compositions 8 and 9 are set forth in Table 5 below.

TABLE 5

|  | Comp. 8 | Comp. 9 |
|---|---|---|
| NR | 100 | 100 |
| Black N326 | 45 |  |
| Black A |  | 48 |
| ZnO | 7.50 | 7.50 |
| Stearic acid | 0.90 | 0.90 |
| Antioxidant | 1.50 | 1.50 |
| Cobalt salt* | 0.20 | 0.20 |
| Insoluble sulphur | 5.60 | 5.60 |
| Accelerator | 0.93 | 0.93 |

*phr of cobalt metal

The natural rubber (NR) which is used is peptised and has a Mooney viscosity ML, (1+4) at 100° C. equal to 60.

The antioxidant used is N-(1,3-dimethylbutyl)-N'-phenyl-p-phenylenediamine.

These compositions 8 and 9 are obtained by mixing all the aforementioned constituents, except for the cobalt salt, the sulphur and the accelerator, by thermomechanical working in an internal mixer in one stage, of a duration of about 4 minutes with a speed of rotation of the blades of 50 rpm, until a dropping temperature of approximately 170° C. is obtained, followed by a finishing step effected at 80° C., during which are incorporated the cobalt salt, the sulphur and the vulcanisation accelerator.

The cross-linking is effected at 150° C. for a time sufficient to achieve 99% of the maximum torque on a rheometer.

The properties in the cross-linked state and in the non-cross-linked state of these compositions 8 and 9 were compared. The results are set forth in Table 6 below.

TABLE 6

|  | Composition 8 | Composition 9 |
|---|---|---|
| ML(1 + 4) at 100° C. | 89 | 85.5 |
| M10 in MPa | 5.8 | 6.3 |
| as base 100 | 100 | 109 |
| HL in % | 18.5 | 14.2 |
| as base 100 | 100 | 77 |
| Break at 100° C.: |  |  |
| FR in MPa | 17.5 | 15.0 |
| AR in % | 530 | 425 |
| Tearability at 100° C.: |  |  |
| FRD in N/mm | 29.0 | 36.5 |
| ARD in % | 130 | 180 |

It would appear that the carbon black A imparts to the composition 9 according to the invention hysteresis properties at high deformation (HL at 60° C.) which are improved by 23% (going from 18.5% to 14.2%) compared with those of the "control" composition 8 comprising the black N326, this composition 9 furthermore having a modulus of elongation at low deformation (M10) which is close to that of said composition 8, which makes said composition 9 particularly well suited for use in the carcass reinforcement of tires intended to bear heavy loads.

It will be noted that the other properties of this composition 9 according to the invention are comparable to those of said "control" composition 8.

3) Third Series of Examples

The object of the following examples is also to compare two rubber compositions each having in the cross-linked state a secant tensile modulus M10 of approximately 6 MPa, which are both based on natural rubber and which comprise respectively two different carbon blacks as reinforcing filler, in a quantity of black of between 40 and 50 phr.

The first composition 10 is a "control" composition representing the known prior art, and it comprises 47 phr of carbon black designated "N326".

The second composition 11 is in accordance with the invention, and it comprises, on one hand, 47 phi of said carbon black A of the name "CRX1416B" and, on the other hand, 1 phr of a methylene donor and 2 phr of a methylene acceptor as reinforcing organic filler.

The formulations of compositions 10 and 11 are set forth in Table 7 below.

TABLE 7

|  | Composition 10 | Composition 11 |
|---|---|---|
| NR | 100 | 100 |
| Black N326 | 47 |  |
| Black A |  | 47 |
| ZnO | 7.5 | 9 |
| Stearic acid | 0.9 | 0.5 |
| Antioxidant | 1.5 | 1.8 |
| Cobalt salt* | 0.2 | 0.15 |
| "Methylene acceptor" |  | 2 |
| "Methylene donor" |  | 1 |
| Insoluble sulphur | 5.6 | 3.13 |
| Accelerator | 0.93 | 0.6 |

*phr of cobalt metal

The natural rubber (NR) which is used is peptised and has a Mooney viscosity ML, (1+4) at 100° C. equal to 60.

The antioxidant used is N-(1,3-dimethylbutyl)-N'-phenyl-p-phenylenediamine.

The methylene acceptor is a "novolac" phenolic resin sold by INSPEC under the name "Penacolite B20".

The methylene donor is hexamethylenetetramine.

These compositions 10 and 11 are obtained by mixing all the aforementioned constituents, except for the cobalt salt, the sulphur, the accelerator and the methylene donor, by thermomechanical working in an internal mixer in one stage, of a duration of about 4 minutes with a speed of rotation of the blades of 50 rpm, until a dropping temperature of approximately 170° C. is obtained, followed by a finishing step effected at 80° C., during which are incorporated the cobalt salt, the sulphur, the vulcanisation accelerator and the methylene donor.

The cross-linking is effected at 140° C. for a time sufficient to achieve 99% of the maximum torque on a rheometer.

The properties in the cross-linked state and in the non-cross-linked state of these compositions 10 and 11 were compared. The results are set forth in Table 8 below.

TABLE 8

|  | Composition 10 | Composition 11 |
|---|---|---|
| ML(1 + 4) at 100° C. | 78 | 94 |
| M10 in MPa | 5.9 | 5.8 |
| as base 100 | 100 | 98 |
| HL in % | 18.1 | 14.6 |
| as base 100 | 100 | 81 |
| Break at 100° C.: |  |  |
| FR in MPa | 16.7 | 15.8 |
| AR in % | 490 | 500 |
| Tearability at 100° C.: |  |  |
| FRD in N/mm | 24.9 | 35.1 |
| ARD in % | 155 | 153 |

It would appear that the carbon black A imparts to the composition 11 according to the invention hysteresis properties at high deformation (HL at 60° C.) which are improved by 19% (going from 18.1% to 14.6%) compared with those of the "control" composition 10 comprising the black N326, this composition 11 furthermore having a modulus of elongation at low deformation (M10) which is close to that of the composition 10, without impairing the cohesion properties (break and tearability), which makes this composition 11 according to the invention particularly well suited for use in the carcass reinforcement of tires intended to bear heavy loads.

The invention claimed is:

1. A carcass reinforcement for a tire which is intended to bear heavy loads, said reinforcement comprising a composite fabric which comprises a cross-linkable or cross-linked rubber composition having a reduced hysteresis in the cross-linked state and metal cables reinforcing said composition, which comprises:
  an elastomeric matrix comprising natural rubber or a synthetic polyisoprene in a majority proportion, and
  a reinforcing filler comprising a carbon black,
  wherein said carbon black meets all of the following conditions:
    (i) $50 \leq$ CTAB specific surface area in $m^2/g$ (in accordance with Standard ASTM D3765-80) $\leq 55$,
    (ii) $45 \leq$ BET specific surface area in $m^2/g$ (in accordance with Standard ASTM D4820-93) $\leq 70$, (iii) $45 \leq$ iodine adsorption index IA in mg/g (in accordance with Standard ASTM D1510-81)$\leq 70$
(iv) ratio (BET surface area/index IA)$\leq 1.05$,
(v) $115 \leq$ DBP structure value in ml/100 g (in accordance with Standard ASTM D2414-93)$\leq 170$,
(vi) 85 nm$\leq$Stokes diameter dst in nm$\leq 145$,
where dst is the diameter of aggregates corresponding to the maximum frequency of the Stokes diameters in a distribution of aggregates, and
(vii) $D50/dst \geq 0.0090 \cdot CTAB + 0.19$,
where D50 is the difference, in the distribution of aggregates, between the Stokes diameters of two aggregates corresponding to one and the same frequency equal to 50% of the maximum frequency of the Stokes diameters, dst and D50 being measured by centrifugal photosedimentometry.

2. The carcass reinforcement according to claim 1, wherein said carbon black furthermore meets the following condition:
(viii) $80 \leq$ DBPC structure value in ml/100 g (in accordance with Standard ASTM D3493-91) $\leq 130$,
the value DBPC being measured after 4 compressions at 24,000 psi.

3. The carcass reinforcement according to claim 2, wherein said carbon black furthermore meets the following condition:
(ix) $85 \leq$ DBPC structure value in ml/100 g$\leq 125$.

4. The carcass reinforcement according to claim 1, wherein said carbon black further meets the following conditions:
(xi) $50 \leq$ BET specific surface area in m$^2$/g$\leq 65$,
and
(xii) $50 \leq$ iodine adsorption index IA in mg/g$\leq 65$.

5. The carcass reinforcement according to claim 1, wherein said carbon black further meets the following condition:
(xiv) $120 \leq$ DBP structure value in ml/100 g$\leq 165$.

6. The carcass reinforcement according to claim 1, wherein said carbon black further meets the following condition:
(xv) $90 \leq$ Stokes diameter dst in nm$\leq 140$.

7. The carcass reinforcement according to claim 1, wherein said carbon black further meets the following condition:
(xvi) $D50/dst \geq 0.0092 \cdot CTAB + 0.21$.

8. The carcass reinforcement according to claim 1, wherein said elastomeric matrix comprises a blend of natural rubber or of synthetic polyisoprene with at least one diene elastomer, optionally functional, belonging to the group consisting of polybutadienes, copolymers of styrene and butadiene prepared in solution or in emulsion, copolymers of butadiene and isoprene and terpolymers of styrene, butadiene and isoprene, the natural rubber or the synthetic polyisoprene being present in said composition in a quantity equal to or greater than 70 phr (phr : parts by weight per hundred parts of elastomers).

9. The carcass reinforcement according to claim 1, wherein said carbon black is present in said reinforcing filler in a mass fraction greater than 50% and less than or equal to 100%.

10. The carcass reinforcement according to claim 9, wherein said carbon black is present in said reinforcing filler in a mass fraction of from 70% to 100%.

11. The carcass reinforcement according to claim 9, wherein said reinforcing filler comprises a blend of said carbon black and a reinforcing inorganic filler.

12. The carcass reinforcement according to claim 11, wherein said reinforcing inorganic filler is a silica.

13. The carcass reinforcement according to claim 11, wherein said reinforcing filler which comprises a blend of said carbon black and a reinforcing organic filler further comprises a methylene donor/methylene acceptor system.

14. The carcass reinforcement according to claim 13, wherein said composition comprises:
between 30 phr and 70 phr of said carbon black,
between 1 phr and 10 phr of said methylene acceptor, and
between 0.5 phr and 5 phr of said methylene donor.

15. The carcass reinforcement according to claim 13, wherein said methylene acceptor is a phenolic resin.

16. The carcass reinforcement according to claim 15, wherein said phenolic resin is a novolak phenolic resin.

17. The carcass reinforcement according to claim 13, wherein said methylene donor is selected from the group consisting of hexamethylenetetramine, hexamethoxymethylmelamine, hexaethoxymethylmelamine, para-formaldehyde polymers, N-methylol melamine derivatives, and mixtures of these compounds.

18. A carcass reinforcement according to claim 1, wherein said composite fabric comprises said metal cables in a cable density of between 15 and 100 cables per dm of fabric.

19. The carcass reinforcement according to claim 18, wherein the distance between two adjacent radial cables, from axis to axis, is of between 1 and 6 mm.

20. The carcass reinforcement according to claim 19, wherein the width 1 of a rubber bridge between two adjacent cables is between 0.25 and 1.5 mm.

21. The carcass reinforcement according to claim 20, wherein said width 1 of the rubber bridge is between 0.35 and 0.85 mm.

22. The carcass reinforcement according to claim 18, wherein said cable density is between 50 and 80 cables per dm of fabric, said reinforcement being intended for a heavy-vehicle tire.

23. The carcass reinforcement according to claim 22, wherein the distance between two adjacent radial cables, from axis to axis, is between 1.25 and 2 mm.

24. The carcass reinforcement according to claim 18, wherein said cable density is of between 20 and 35 cables per dm of fabric, said reinforcement being intended for a construction-machinery tire.

25. The carcass reinforcement according to claim 24, wherein the distance between two adjacent radial cables, from axis to axis, is between 2.5 and 5.5 mm.

26. The carcass reinforcement according to claim 1, wherein said rubber composition has, in the cross-linked state and measured in accordance with Standard ASTM D 412, a secant tensile modulus M10 which is less than 12 MPa.

27. The carcass reinforcement according to claim 26, wherein said rubber composition has, in the cross-linked state and measured in accordance with Standard ASTM D 412, a secant tensile modulus M10 which is of between 5 and 11 MPa.

28. A tire for a vehicle intended to bear heavy loads which comprises a carcass reinforcement according to claim 1.

29. A tire for a heavy vehicle, which comprises a carcass reinforcement according to claim 22.

30. A tire for construction machinery, which comprises a carcass reinforcement according to claim 24.

* * * * *